US008168514B2

(12) United States Patent
Garner et al.

(10) Patent No.: US 8,168,514 B2
(45) Date of Patent: May 1, 2012

(54) LASER SEPARATION OF THIN LAMINATED GLASS SUBSTRATES FOR FLEXIBLE DISPLAY APPLICATIONS

(75) Inventors: Sean Matthew Garner, Elmira, NY (US); Xinghua Li, Painted Post, NY (US); Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 195 days.

(21) Appl. No.: 11/509,448

(22) Filed: Aug. 24, 2006

(65) Prior Publication Data

US 2008/0050888 A1 Feb. 28, 2008

(51) Int. Cl.
*H01L 21/00* (2006.01)
(52) U.S. Cl. .................................. 438/463; 219/121.67
(58) Field of Classification Search ............. 219/121.67; 438/463
See application file for complete search history.

(56) References Cited

U.S. PATENT DOCUMENTS

| | | | | |
|---|---|---|---|---|
| 5,622,540 A | * | 4/1997 | Stevens | 65/112 |
| 5,756,961 A | * | 5/1998 | Sato et al. | 219/121.67 |
| 6,388,231 B1 | * | 5/2002 | Andrews | 219/121.69 |
| 6,592,703 B1 | | 7/2003 | Habeck | 156/257 |
| 6,723,952 B2 | | 4/2004 | Choo et al. | 219/121.72 |
| 6,815,070 B1 | | 11/2004 | Buerkle | 428/425.6 |
| 6,894,249 B1 | | 5/2005 | Hauer | 219/121.72 |
| 7,026,573 B2 | * | 4/2006 | Worrall et al. | 219/121.72 |
| 7,223,936 B2 | * | 5/2007 | Acker et al. | 219/121.67 |
| 2002/0006765 A1 | | 1/2002 | Michel et al. | |

OTHER PUBLICATIONS

V. Kozhukharov, D. Dmititrov and D. Tonchev, "Interaction of $CO_2$ laser radiation with Glasses", Infrared Phys. 29, 415, 1989.
H. Y. Zheng and T. Lee, "Studies of $CO_2$ laser peeling of glass substrates", J. Micromech. Microeng. 15, 2093, 2005.
G. Allcock, P. E. Dyer, G. Elliner and H. V. Snelling, "Experimental observations and analysis of $CO_2$ laser-induced microcracking of glass", J. Appl. Phy. 78, 7295, 1995.
H. E. Cline and T. R. Anthony, "Heat treating and melting material with a scanning laser or electron beam", J. Appl. Phys. 48, 3895, 1977.
B. A. Boley and J.H. Weiner, "Theory of Thermal Stresses" (wiley, New York, 1960).
E. Mendez, H. J. Baker, K. M. Nowak, F. Villarreal, D. R. Hall, "Highly localized $CO_2$ laser cleaning and damage repair of silica optical surfaces", in Laser-induced Damage in Optical Materials, 2004, edited by G. J. Exarhos et al, Proceedings of SPIE vol. 5647 (SPIE, Bellingham, WA 2005); (Listed in Identification and Measurement of changes in the properties of molecular contamination related laser induced damage to fused silica).
Y.M. Xiao and M. Bass, "Thermal stress limitations to laser fire polishing of glasses", Appl. Opt. 22, 2933, 1983.

(Continued)

*Primary Examiner* — David Vu
*Assistant Examiner* — Caleb Henry
(74) *Attorney, Agent, or Firm* — Thomas R. Beall

(57) ABSTRACT

A method of separating a sheet of coated brittle material comprises the steps of providing a sheet of layered brittle material comprising a brittle layer and a coating material adhered to a surface of the brittle layer and applying a laser along a separation line in the sheet, thereby cutting the coating material and separating the brittle layer by inducing a stress fracture therein.

16 Claims, 3 Drawing Sheets

OTHER PUBLICATIONS

G. A. Markillie, H. J. Baker, F. J. Villarreal and D. R. Hall, "Effect of vaporization and melt ejection on laser machining of silica glass micro-optical components", Appl. Optics 41, 5660, 2002.

H. Y. Zheng and T. Lee "Studies of C02 laser peeling of glass substrates", J. Micromech. Microeng. 15, 2093, 2005.

G. Allcock, PE Dyer, G. Elliner and H.V. Snelling, "Experimental observations and analysis of C02 laser-induced microcracking of glass", J. Appl. Phy. 78, 7295, 1995.

HE Cline and TR Anthony, "Heat treating and melting material with a scanning laser or electron beam", J. ppl. Physics 48, 3895, 1977.

E. Mendez, H. J. Baker, K.M. Nowak, F. Villarreal, D. R. Hall, "Highly localized C02 laser cleaning and damage repair of silica optical surfaces", in Laser-induced Damage in Optical Materials, 2004, edited by G. J. Exarhos etal, Proceedings of SPIE vol. 5647 (SPIE, Bellingham, WA 2005).

Y.M. Xiano and M. Bass, "Thermal stress limitations to laser fire polishing of glasses" Appl. Opt. 22, 2933, 1983.

* cited by examiner

LASER SEPARATION OF THIN LAMINATED GLASS SUBSTRATES FOR FLEXIBLE DISPLAY APPLICATIONS

BACKGROUND OF THE INVENTION

1. Field of the Invention

The present application relates to the separation of a sheet of brittle material via a laser, and more particularly to laser inducement of a stress fracture within a brittle layer that has a protective coating on its surface, thereby cutting the sheet of brittle material into multiple pieces.

2. Description of Related Art

Flat glass substrates are a suitable substrate material for many applications where transparency, high chemical and thermal resistance, and defined chemical and physical properties are important. These applications typically include those areas where thin film and thick film technologies are utilized including displays, thin and thick film sensors, solar cells, micro-mechanical components, lithographic masks, and electronic applications, such as within sensors and membrane elements. Recent developments in many electronic applications have created a demand for new product functionalities, and have generated an increase in demand for ever thinner and ultra-thin as well as mechanically durable substrates. In particular, these ultra-thin substrates provide light and flexible displays ideal for use within portable pocket devices having a rounded housing form, such as cell phones, pen-type devices with pull-out screens, displays for smart cards, pricing labels, as well as displays that are based on organic or inorganic light emitting layers, or light emitting organic polymer displays (OLED). Thin and durable substrates may also be valued for applications where the final product remains flat, but low cost manufacturing requires mechanically flexible substrates. In a broader category outside of displays, flexible and durable electronic devices in general such as RFIDs, photovoltaics, and sensors value these advanced substrate designs.

The various flexible electronic devices typically have a variety of designs based on their intended application and required performance level. Some degree of bending radius and conformal nature are possible to obtain from liquid crystal displays based on cell gaps as well as OLED or similar displays hermetically sealed between two parallel plates. The larger flexibility displays currently being pursued that are capable of bend radii approaching 1 cm or below are mainly based on OLED, cholesteric liquid crystal, electrophoretic, or similar approaches. These designs typically consist of various transistor circuitries, display, and encapsulating layers built upon a highly mechanically durable substrate.

Substrate materials for manufacturing the individual components typically include thermoplastic materials, such as polyethylene naphthalate, polyethersulfone, polycarbonate, and the like, materials such as metal stainless steel, and glass materials. While the metal substrate materials offer higher thermal capability, they are opaque and may present electrical conductivity issues. The glass material provides the advantages of being chemically and photo-chemically inert, optically isotropic, temperature-resistant, mechanically stable, and provides a relatively hard surface. However, a significant drawback to the glass materials is a tendency to be more brittle and the sensitivity to flaws. The thermoplastic substrates are less sensitive to flaw size, but are limited in their thermal capability as well as their barrier properties. Specifically, limiting water vapor and oxygen permeability of plastic substrate films is difficult, and results in an overall reduction in relative quality and life time of the associated OLEDs or organic electronic devices made on such substrate materials unless a separate barrier layer is used.

As noted above, flexible displays are currently being pursued for future display and electronic technologies. As a result of the drawbacks of singular glass or plastic substrates, glass-plastic composite films are being extensively investigated. Such films typically consist of a thin glass sheet and a polymeric layer applied directly to at least one of the planar surfaces of the glass. Glass sheets in this case refer to sheets of brittle inorganic material that can include glass, ceramics, glass-ceramics, or similar materials sensitive to surface or edge flaws. The polymeric layer refers to any more ductile layer applied to the glass surface for the purpose of protecting against damage. The actual substrate can be made of one or more glass layers with one or more polymeric layers in various configurations. The thickness of any glass layer is typically less than 300 µm for a thin laminated glass substrate for flexible display applications. Laminated or composite glass substrate refers to the combined glass and polymeric structure. The structure can be fabricated through a lamination process of adhering previously formed sheets or through various coating, deposition, curing, or other processes that utilize liquid components.

While such glass-plastic composite films are highly advantageous, applications and performance of such substrates have been severely limited due to low edge strengths caused during the cutting thereof. Heretofore, most glass cutting has been accomplished by mechanical score and break methods. These methods are both simple and economic and can be used for glass sheets with a thickness of a few hundred microns or greater. However, these mechanical cutting techniques, applicable to the thicker sheet glass of approximately 0.5 mm thicknesses or greater, result in a lower yield strength when used to cut glass sheets having a thickness of less than 300 µm. Moreover, complications arise with laminated glass substrates due to the presence of the protective polymeric layer(s).

Efforts to cut these coated, thin glass sheets have thus far included mechanical processes. For example, methods have been disclosed that include heating a plastic layer while simultaneously applying a load via a cutting tool. The plastic is severed simultaneously with the scoring of the glass substrate. This method still relies on a mechanical means of cutting the composite substrate by using physical contact between the substrate and cutting tool, and leads to a rupture of the laminated glass substrate along the scoring line. In the method described in U.S. Pat. No. 6,894,249, entitled METHOD AND DEVICE FOR CUTTING A FLAT WORKPIECE THAT CONSISTS OF A BRITTLE MATERIAL, a laser is utilized to induce a thermal mechanical stress in the work piece along the cutting line. Similar to the method as described above, this method requires a mechanical scoring tool to generate an initial score at the beginning of the associated cutting line. The laser power is then used to produce separation along this cutting line due to thermal stress.

A need exists to efficiently cut substrates composed of multiple materials with widely varying mechanical properties, such as those comprised of glass and polymer. Specifically, these new multilayer substrate designs for applications such as flexible displays and flexible electronics require new cutting methods that are not based on physical contact with a scoring or cutting tool.

SUMMARY OF THE INVENTION

A preferred embodiment of the present invention includes a method of separating a sheet of coated brittle material comprising the steps of providing a sheet of layered brittle material comprising a brittle layer having a thickness of less than or equal to about 100 μm and a coating material adhered to a surface of the brittle layer, and cutting the coating material by applying a laser along a separation line of the sheet without substantial debris remaining along the separation line. This exposed surface area of the brittle layer is then separated using subsequent laser or etching processes.

In another preferred embodiment of the present invention, the method includes inducing a stress fracture within the brittle layer of a composite substrate via the laser. The composite substrate is comprised of at least one brittle layer and at least one coating layer. The laser induced stress fracture in the brittle layer separates both the one or more brittle layer and the one or more coating layer.

Another preferred embodiment of the present invention includes a method of forming a flexible substrate for a device application comprising the steps of providing a sheet of glass having a first planar surface and a second planar surface opposite the first planar surface, and coating at least a portion of at least a select one of the first planar surface and the second planar surface with a polymer material, thereby creating a coated substrate. The method further comprises applying a laser to the coated substrate of glass along a separation line separating a portion of the polymer material from the glass sheet and inducing a stress fracture within the sheet of glass, thereby cutting a flexible device substrate from the original coated substrate.

DETAILED DESCRIPTION OF THE PREFERRED EMBODIMENTS

Figure 1A:
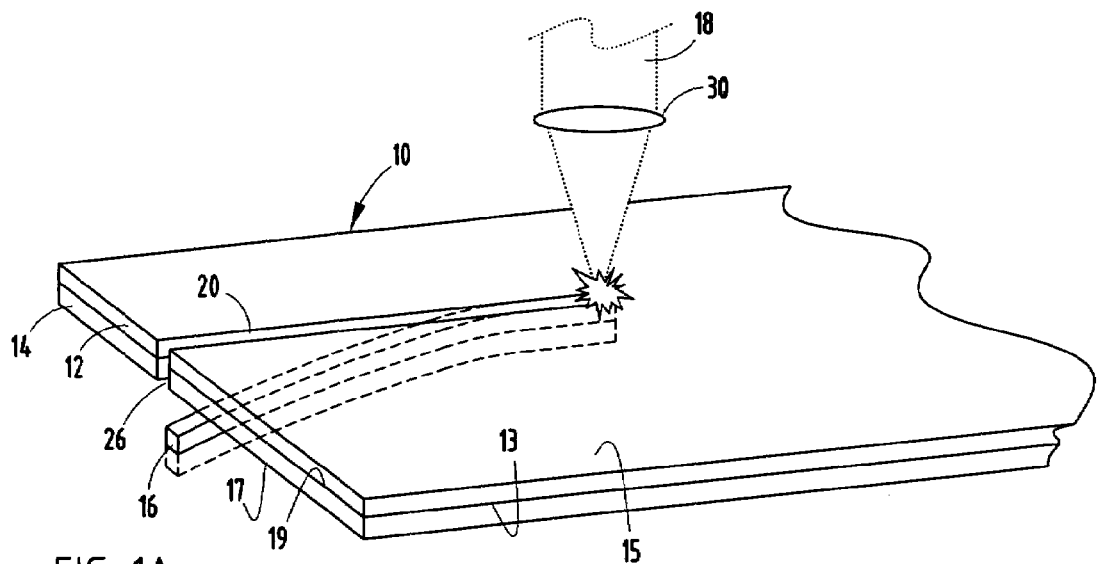
FIG. 1A is a partial schematic perspective view of a laser separating a brittle material into multiple pieces, and embodying the present invention, wherein the laser is applied to the brittle layer opposite a coated side thereof.
Figure 1B:
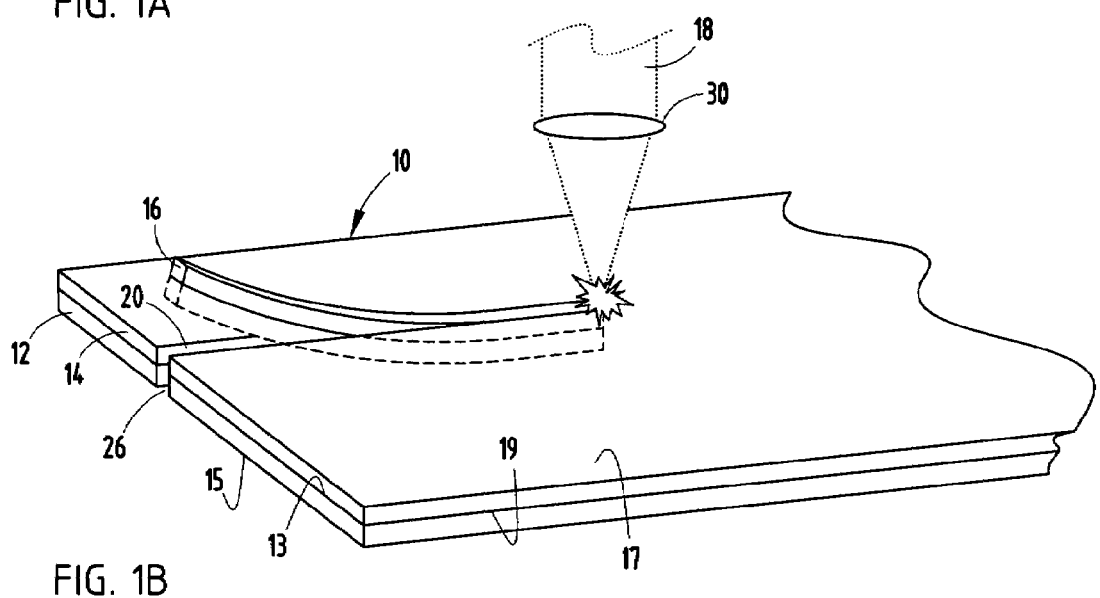
FIG. 1B is a partial schematic perspective view of the laser separating a portion of a coating material from a brittle layer of an overall coated brittle material, and alternatively, the inducement of a stress fracture in the brittle layer and the cutting thereof, wherein the laser is applied to a coated side of the brittle material.
Figure 2:
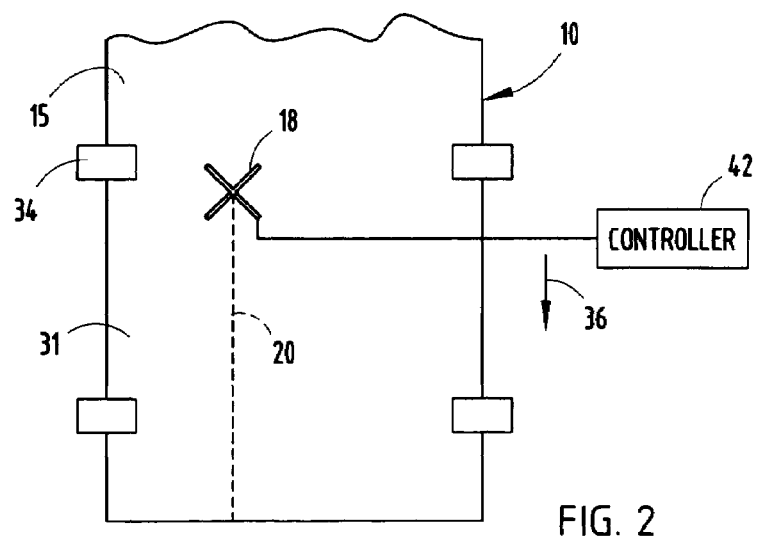
FIG. 2 is a front elevational schematic view of an apparatus employable with the laser.

For purposes of description herein, the terms "upper," "lower," "right," "left," "rear," "front," "vertical," "horizontal," and derivatives thereof shall relate to the invention as oriented in FIGS. 1-3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The present inventive process includes a method of separating a sheet of coated brittle material 10 (FIG. 1A). The method comprises the steps of providing a sheet of coated brittle material 10 that includes a brittle layer 12 having a first planar surface 13 and a second planar surface 15 opposite the first planar surface 13 and preferably comprising glass, and a coating material 14 adhered to first planar surface 13 of the brittle layer 12, and having an outer surface 17 and an inner surface 19 and preferably comprising a polymer. In the illustrated example, the brittle layer 12 comprises a glass, however, other suitable materials may be utilized including ceramic, glass-ceramic and the like. In addition, multilayered structures may be utilized such as those comprised of two adhered glass layers of differing compositions. It is noted that the brittle or glass layer 12 may be coated by a coating material on both the first and second surfaces 13, 15 thereof. The coating material 14 of the illustrated brittle material 10 comprises a polymeric or thermoplastic layer that serves as a mechanical protection for the quality of the covered surface of the brittle layer. The method further comprises separating the sheet of coated brittle material 10 into multiple pieces by applying a laser 18 along a separation line 20 (FIG. 2). In the illustrated example of FIG. 1A, the laser 18 is applied to the non-coated side 15 of the brittle layer 12, and results in the separation of a separated portion 16 having a width that is comparable to the incident beam diameter of the laser 18. The process of separating the portion 16 may also remove the coating material 14 from the portion 16. In a preferred embodiment, the method preferably comprises inducing a stress fracture within the brittle layer 12 along the separation line 20 via the laser 18 separating the sheet 10 into more than one piece. Alternatively, the power of the laser 18 is managed to remove a portion of the coating material 14 from the brittle layer 12 without causing a stress fracture in the brittle layer 12.

Another embodiment of the present invention as illustrated in FIG. 1B, includes a method of removing a portion of the coated material 14 from the brittle layer 12 by applying the laser 18 to the outer surface 17 of the coating material 14. Selective removal of the coating material 14 thereby exposes a selective amount of surface area of the brittle layer 12 which is left substantially intact. Subsequent etching or cutting steps can then be used to separate the brittle material 12 into more than one piece along the path of exposed surface area. Alternatively, the method still further comprises inducing a stress fracture within the brittle layer 12 along the separation line 20 via the laser 18 thereby separating the sheet 10 into more than one piece.

The one or more brittle layer 12 and one or more coating layer 14 can vary in material composition and dimension depending on the requirements for the intended application. For example, the display or electronic fabrication process may place thermal requirements on the coating layer 14 selection, fabrication of Si TFT devices may place alkali ion composition restrictions on the brittle layer 12 material, and flexibility or bend radius requirements of either the device fabrication or final usage may place structural thickness and modulus requirements on the composite substrate 10 design. Further, the composite substrate 10 can be fabricated through a variety of methods known in the field such as thin film lamination, liquid coating, extrusion, and related technologies. To achieve practical flexible device bend radii of preferably less than 10 cm, more preferably less than 5 cm, and most preferably less than 20 cm, the thickness of the brittle layer 12 should be preferably less than 100 μm, more preferably less than 50 μm, and most preferably less than 30 μm.

Figure 3A:
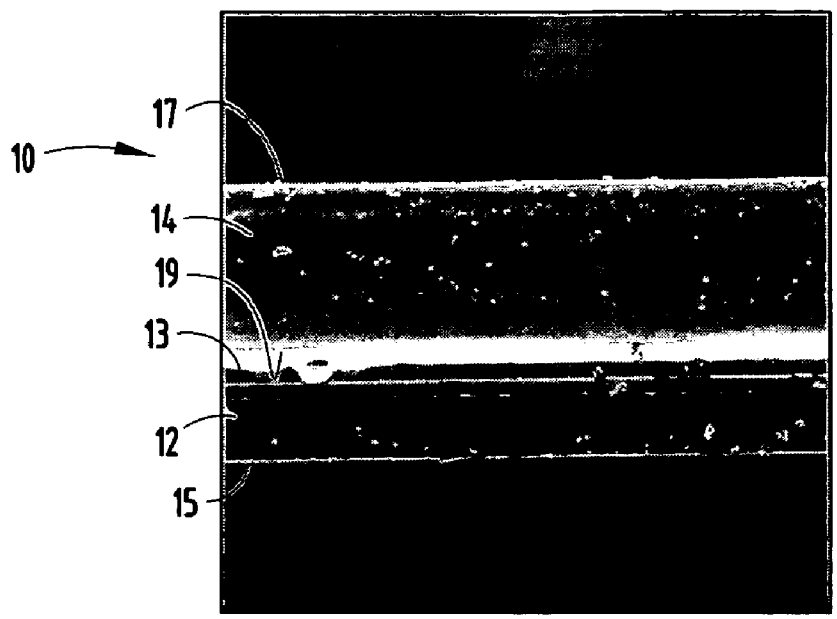
FIG. 3A is a side elevational view of an edge of the coated brittle material, wherein the brittle material has been separated into multiple separate pieces, and wherein the separation was accomplished with a laser traveling at 40 mm/s relative to a surface of the brittle material.
Figure 3B:
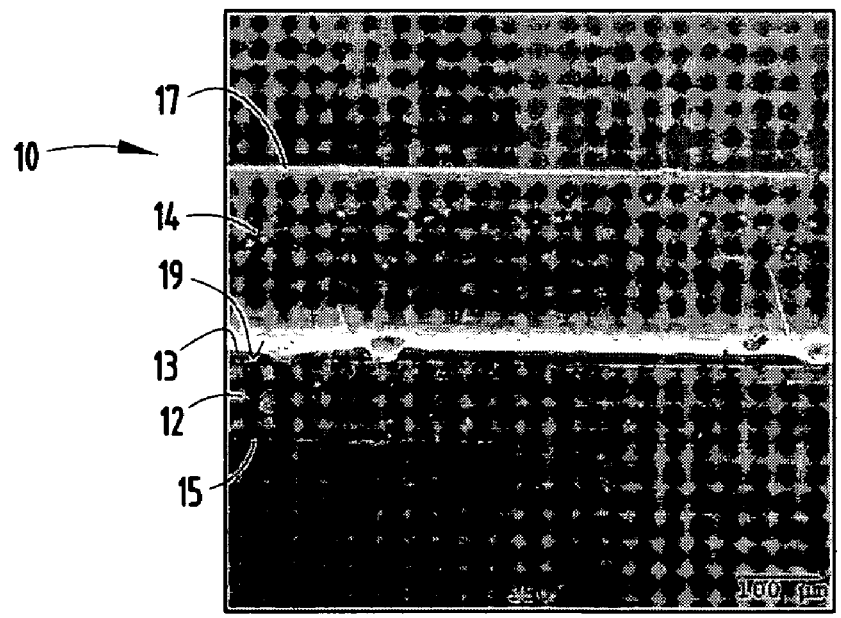
FIG. 3B is a side elevational view of an edge of the coated brittle material, wherein the brittle material has been separated into multiple separate pieces, and wherein the separation was accomplished with a laser traveling at 60 mm/s relative to a surface of the brittle material.

Almost all glasses strongly absorb laser energy in the 10 μm wavelength region. In most cases, the absorption is strong enough that light is being absorbed completely within the uppermost 10-20 μm thickness. In the illustrated example, laser 18 comprises a $CO_2$ laser which is capable of producing local heating on the brittle or glass layer 12. The photon energy of a $CO_2$ laser of wavelength 10.6 μm is 0.11 eV and is much lower than the bandgap energies of the brittle or glass material 12 or the polymeric material 14, and as a result, a photothermal process dominates. Although $CO_2$ lasers are mentioned specifically, it is noted that other laser systems and wavelengths that also produce a dominant photothermal process may be utilized. Strong absorption of the glass material that comprises the brittle layer 12 of radiation at the 10.6 μm wavelength induces, heating, softening and expansion of a relatively thin portion of the glass layer, thereby causing compressive stress in the laser heated volume. This transient compressive stress could reach to a magnitude such that spallation occurs in the brittle or glass layer 12 as a result of compressive failure. However, softening and melting of the glass layer 12 could result in dramatic decrease in the amplitude of the compressive stress due to reduction in viscosity of the brittle or glass material 12. Once the laser irradiation is removed, cooling of the heat affected zone causes contraction and strain, and induces tensile stresses within the vicinity of the heated volume. This tensile stress, which magnitude might be smaller than the transient compressive stress occurred during the heating phase, can result in the spallation of the brittle or glass layer 12 since brittle or glass material is known to fail more readily when in tension than under compression. As a result of this heating-cooling cycle of the glass layer 12, the portion 16 of the brittle layer 12 in the vicinity of the heated volume is separated or peeled from the remaining brittle layer 12. As the portion 16 of the brittle layer is removed, the coating material 14 attached to the separating portion 16 is either also removed or volatilized due to melting or photodecomposition by thermal conduction from the brittle or glass layer 12. In other words, due to laser heating of the material surface, stress is generated that is strong enough that the laminated glass substrate material is overcome. The portion 16 of the brittle material 12, illustrated as a thin slice of material, having a width that is determined by the stress-effected zone, is separated from the coated substrate 10 along the direction of the moving laser 18. Preferably, the laser comprises a $CO_2$ laser and is applied to a glass layer 12 having a high thermal shock resistance. The peeling effect occurs with both long pulse and cw lasers. It is noted that long pulse and cw lasers typically have lower peak power in comparison with short pulse lasers, and that effects typically associated with short pulse lasers, such as ablation, tend to be much weaker. In addition, little or no particulate debris result during the laser peeling process as described above. By applying the above-described process, the brittle material 10 may be separated into multiple pieces each having edges with good surface finish as shown in FIGS. 3A and 3B. Through this process, substantially no coating material 14 exists on the endface of the brittle layer 12 along the separation line 20. Additionally, the coating material 14 may exist on surface 13 of the brittle material 12 up to the separation line 20. In this case, the coating material 14 may show signs of thermal exposure such as melting effects along the separation line 20.

In the illustrated example, the $CO_2$ laser 18 is focused on the surface 15 of the composite coated brittle material 10 via a focusing element 30. FIG. 2 shows a schematic presentation of a process for cutting the sheet of coated brittle material 10 during a continuous manufacturing process to remove an edge portion 31 of the substrate 10. The substrate of coated brittle material 10 is held vertically by a plurality of rollers 34, and additional rollers or mechanisms may be used to the composite substrate 10 or removed edge portion 31. The composite substrate 10 is moved relative to the incident laser energy 18 in a direction represented by directional arrow 36. This relative movement causes the laser energy 18 to trace along the vertical separation or cutting line 20 and induce a stress fracture within the brittle layer 12. The process/equipment variables effecting the separation/cutting can be controlled by a controller 42. Alternatively, the laser induced stress fracture can be used to separate various lengths of the composite substrate 10 during a continuous substrate or device manufacturing process. The relative motion of the laser 18 to the sheet 10 may also be obtained by scanning the laser 18 across the sheet 10 using a galvo assembly, or by moving the glass laminates placed on an XY table. In addition to cutting straight lines, the laser induced stress fracture can be used to cut various two dimensional patterns from the composite substrate 10.

It was observed that the process was accomplished with an RF $CO_2$ laser radiation generated at a power of tens of watts. It is noted that the laser 18 may be operated in either a cw mode or a pulsed (5 kHz or 20 kHz, for example) mode, with a substantial spatial pulse overlap present during cutting in the latter. With these conditions, it was observed that the laser power generated to induce a substantial stress fracture within the glass layer 12 and result in a total separation or cutting of one portion of the sheet 10 from another was about 23 watts at a speed of 60 mm/s when the laser 18 is incident on the non-coated side 15 of the glass sheet 12. In comparison, power levels of equal to or less than 10 watts were required for only removing the polymeric coating 14 from the glass layer 12 when the laser 18 is incident on the coated side of the glass sheet 12. The exact power levels to cut various composite substrate 10 designs will depend on the required cutting speed, brittle layer 12 composition, coating layer 14 composition, the layer thicknesses, stress present in the composite substrate 10, and other related factors. Although other processes use incident radiation 18 from a CO2 laser is able to cut thicker glass sheets typically greater than 500 μm without the presence or a coating layer 14, the conditions described above produced an uncontrolled fracture in the relatively thin brittle layer 12 of less than 100 μm thickness if a coating layer 14 was not present. Polarization of the laser light is preferably circular, however, linearly polarized light with polarization oriented along the separation or cutting line 20 may also be used. Linearly polarized light having an orientation that is perpendicular to cutting line 20 may also be utilized. Further, the laser 18 is focused onto, within, or near the composite substrate 10 with the focusing element 30 that includes a lens or lens assembly therein. Examples are a singlet spherical lens, a cylindrical lens with focusing axis parallel to the cutting line 20, etc. Alternatively, a parabolic mirror can be used to focus the laser 18.

An alternative approach to separating the brittle material or composite substrate 10 is to use relatively low laser power 18 to selectively remove portions of the coating material 14. By applying the above-described process, the portion of the coating material 14 may be removed from the brittle layer 12 along the separation line 20, leaving behind the groove 26 (FIGS. 4 and 5) free of microcracks with a good bottom surface finish, i.e., with minimal coating or residue present on the brittle material surface 13. The slight delamination of the coating material 14 from the brittle material 12 shown in the side elevational view FIG. 5 may be due to the edge sample preparation process for SEM analysis. Separation of the composite substrate 10 can then be achieved through either a subsequent laser cutting or etching process. Any etching process can utilize the pattern produced in the coating layer 14 as an etch mask. Applicable etching processes commonly known in the field are based on aqueous HF solutions, reactive ion etching plasmas, and similar approaches.

Alternatively, the separation process includes having the laser incident on the coating 14 surface of the composite substrate 10 at sufficient power levels to separate both the brittle layer 12 and coating layer 14 in one step. If multiple coating layers 14 are present on both top 13 and bottom 15 surfaces of the brittle layer 12, a first lower power laser scan 18 is used to selectively remove the upper coating layer. A subsequent higher power laser scan 18 can then be used to induce a stress fracture in the remaining brittle layer and coating layers as described previously. Various combinations of layer materials, laser exposures, and alternative processing steps are also possible.

EXAMPLE 1

The test and sample comprised an application of a laser to the exposed glass surface of a glass sheet, and controlled cutting was obtained in a single pass of the laser. In one particular embodiment, a Synrad RF $CO_2$ laser, available from Synrad, Inc., Mukilteo, Wash., was used as the light source. The laser was modulated at a 5 kHz rate, with the output pulses having a saw-tooth profile, with roughly 90% modulation depth. Light from the laser was vertically polarized. After a quarter-wave reflective phase retarder, polarization was transformed into a circularly polarized state prior to the focusing element 30. A 37.5 mm or 1.5 inch focal length lens was used to focus the laser light on the glass sheet surface 15. Incident laser power on the coated material surface was 23 W. Based on an $M^2$ value of 1.2, and a beam size at the lens entrance pupil of 6 mm, the focal spot size was estimated to be 100 µm with corresponding power density of 300 kW/cm$^2$. The sheet of coated material comprised a glass sheet having a thickness in the range of 50 microns and 100 microns and a polymer coating thereon adhered to one side of the glass. Corning's 0211 Microsheet was used as the glass layer. Ultron Systems P/N 1020R-11.8 or P/N 1042R-11.8 was used as the polymer coating 14 and applied as a laminated film. A constant $N_2$ purge was supplied during cutting in order to reduce the effects of polymeric combustion during cutting. The laminated glass sheet was cut on an XY table equipped with a vacuum chuck. Optimum cutting condition was observed when the laser is focused 0.6 mm above the top surface of the coated material 10, and when the laser light was incident on the side of the glass substrate opposite to the adhered coating. At the optimized conditions, a speed within the range of 40 mm/s to 60 mm/s relative to the sheet was observed and that a continuous strip of the coated material was separated from the coated material. The width of portion 16 is approximately the incident beam diameter on glass surface 15 which is about approximately 200 µm. FIG. 3A illustrates a sample that was cut at a translation speed of 40 mm/s, whereas as FIG. 3B illustrates a sample that was cut at a speed of 60 mm/s. The laser spot size on the glass surface was estimated to be 200 µm in diameter, and the power density was estimated to be 73 Kilowatts per centimeters$^2$. At this power density, it is believed that there is minimum damage of the material through ablation, and the process resulted in cleanly fractured surfaces. Unoptimized conditions will typically result in a portion 16 broken from coating material 14 piecewise whose length vary from centimeter or longer. Such fracture results in jagged edges of the separated coated material, and such is not desired.

EXAMPLE 2

Figure 4:
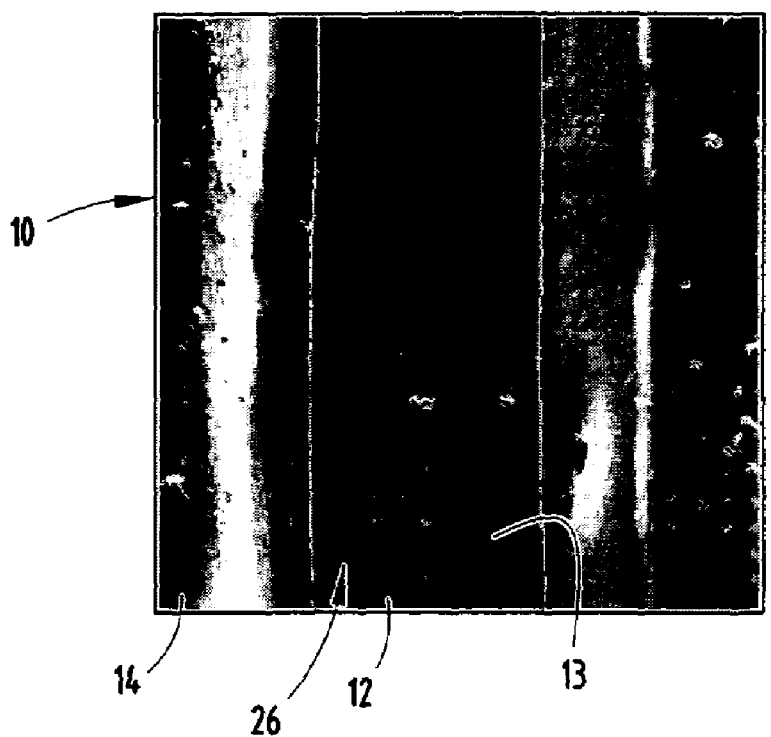
FIG. 4 is a top plan view of the coated brittle material, wherein a portion of the coating material has been separated from the brittle layer along a separation line.
Figure 5:
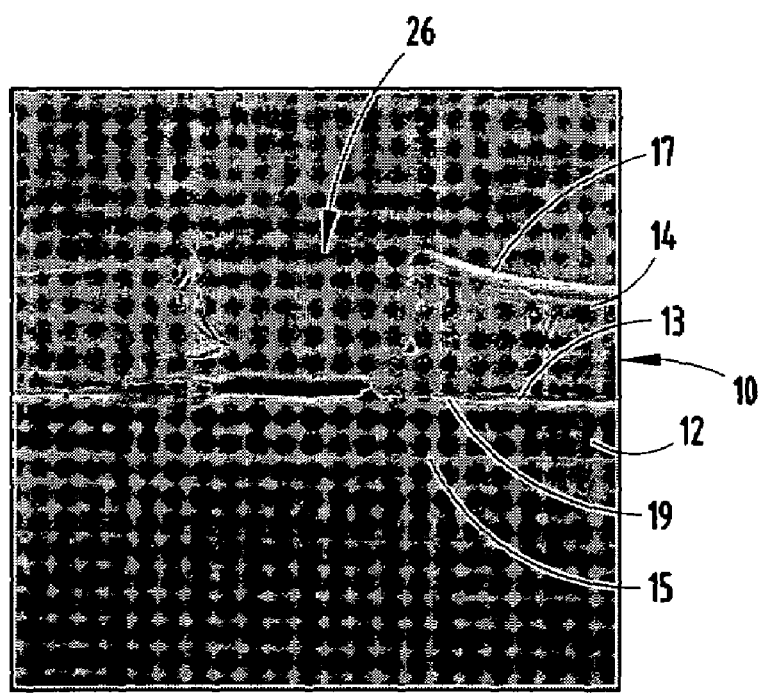
FIG. 5 is a side elevational view of the coated brittle material, wherein a portion of the coating material has been separated from the brittle layer along the separation line, resulting in a polished surface.

In another example, a Synrad RF $CO_2$ laser, as described in Example 1, was used to remove the polymeric coating in the composite material. The laser was modulated at a 5 kHz rate, with the output pulses having a saw-tooth profile and roughly 90% modulation depth. Light from the laser was vertically polarized. A 37.5 mm or 1.5 inch focal length lens was used to focus the laser light on the glass sheet. Polarization of the laser light on the coated material 10 was along the motion path. An incident power of 8 W was used. Based on a $M^2$ value of 1.2, and a beam size at the lens entrance pupil of 6 mm, the focal spot size was estimated to be 100 µm. The sheet of coated material comprised a glass sheet having a thickness in the range of 50 microns and 100 microns and a polymer coating thereon adhered to one side of the glass. A 0211 Microsheet, as available from Corning, Inc. of Corning, N.Y., was used as the glass layer. Ultron Systems (of Haverhill, Mass.) P/N 1020R-11.8 or P/N 1042R-11.8 was used as the polymer coating 14 and applied as a laminated film. A constant $N_2$ purge was supplied during cutting in order to reduce the effects of polymeric combustion during cutting. The laminated glass sheet was secured on an XY table with a vacuum chuck. The laser light is incident on the polymer side of the coated material 10 opposite to the brittle or glass material. With a speed of 20 mm/s the polymer material is selectively removed as shown in FIGS. 4 and 5.

It will become apparent to those skilled in the art that various modifications to the preferred embodiment of the invention as described herein can be made without departing from the spirit or scope of the invention as defined in the appended claims. Thus, it is intended that the present invention covers the modifications and variations of this invention provided they come within the scope of the appended claims and the equivalents thereto.

The invention claimed is:

1. A method of separating a sheet of coated brittle material, the method comprising the steps of:
   providing a sheet of layered brittle material comprising a brittle layer having a thickness of less than or equal to about 300 µm and a coating material adhered to a surface of the brittle layer; and
   cutting the coating material and separating the brittle layer into separate pieces which are not connected to one another by applying a laser along a separation line on the sheet;
   wherein:
   (a) the brittle layer is a glass sheet, a ceramic sheet, or a glass ceramic sheet;
   (b) the separating comprises inducing a stress fracture within the brittle layer via the laser simultaneous with the cutting step;
   (c) the simultaneous cutting of the coating material and separating of the brittle layer into separate pieces is performed without mechanical contact with a scoring or cutting tool either prior to or during the applying of the laser along the separation line; and (d) as a result of the simultaneity of the cutting of the coating material and the separating of the brittle layer, substantial particulate debris does not remain along the separation line.

2. The method of claim 1, wherein the step of cutting the coating material comprises providing the laser as a $CO_2$ laser.

3. The method of claim 1, wherein the separating step further comprises applying the laser to a surface of the brittle layer opposite the surface of the brittle layer to which the coating material is adhered.

4. The method of claim 1, wherein the step of inducing the stress fracture further comprises providing the laser as a $CO_2$ laser, operating in at least a select one of a cw and a pulsed mode with a spatial pulse overlap during cutting.

5. The method of claim 1, wherein the cutting step comprises providing the laser to have a circular polarization.

6. The method of claim 1, wherein the cutting step comprises providing the laser to have a linear polarization substantially aligned with the cutting line.

7. The method of claim 1, wherein the step of providing the sheet of layered brittle material further comprises providing the coating material as a polymer.

8. The method of claim 1, wherein the separating step comprises moving the laser along the separation line at a speed of greater than or equal to about 40 mm/s.

9. A method of forming a flexible substrate for a display application, the method comprising the steps of:
providing a sheet of glass having a first planar surface and a second planar surface opposite the first planar surface;
coating at least a select one of the first planar surface and the second planar surface with a polymer material, thereby creating a coated substrate; and
applying a laser to the coated substrate of glass along a separation line separating a portion of the polymer material from the glass sheet and inducing a stress fracture within the sheet of glass, thereby cutting the coated substrate into separate pieces which are not connected to one another;
wherein the coated substrate of glass is cut into the separate pieces without mechanical contact with a scoring or cutting tool either prior to or during the applying of the laser to the coated substrate of glass along the separation line.

10. The method of claim 9, wherein the step of applying the laser comprises applying the laser to an uncoated surface of the sheet of glass.

11. The method of claim 9, wherein the step of applying the laser comprises providing the laser as a $CO_2$ laser.

12. The method of claim 11, wherein the step of applying the laser comprises providing the laser as a $CO_2$ laser operating in at least a select one of a cw and pulsed modes.

13. The method of claim 9, wherein the step of applying the laser further comprises providing the laser at a power density of less than or equal to about 100 $kW/cm^2$.

14. The method of claim 9, wherein the step of applying the laser comprises moving the laser along the separation line at a speed of greater than or equal to about 40 mm/s.

15. The method of claim 9, wherein the step of applying the laser comprises providing the laser to have a circular polarization.

16. The method of claim 9, wherein the coated substrate is capable of a bend radius of less than or equal to about 5 cm subsequent to the laser applying step.

* * * * *